US010444962B2

United States Patent
Gajulapally et al.

(10) Patent No.: US 10,444,962 B2
(45) Date of Patent: *Oct. 15, 2019

(54) DISPLAYING AN IMAGE ON AN IRREGULAR SCREEN

(71) Applicant: Essential Products, Inc., Palo Alto, CA (US)

(72) Inventors: Adithya Gajulapally, Mountain View, CA (US); Michael Kolb, Redwood City, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/866,088

(22) Filed: Jan. 9, 2018

(65) Prior Publication Data

US 2019/0004687 A1 Jan. 3, 2019

Related U.S. Application Data

(63) Continuation of application No. 15/665,332, filed on Jul. 31, 2017, now Pat. No. 9,959,027.

(60) Provisional application No. 62/531,560, filed on Jul. 12, 2017, provisional application No. 62/528,357, filed on Jul. 3, 2017.

(51) Int. Cl.
*G06F 3/0484* (2013.01)
*G06F 1/16* (2006.01)
*G09G 5/00* (2006.01)
*G09G 3/20* (2006.01)

(52) U.S. Cl.
CPC ........ *G06F 3/04845* (2013.01); *G06F 1/1626* (2013.01); *G06F 1/1686* (2013.01); *G06F 1/1694* (2013.01); *G09G 3/20* (2013.01); *G09G 5/00* (2013.01); *G06F 2200/1614* (2013.01); *G06F 2203/04803* (2013.01); *G09G 2340/0464* (2013.01); *G09G 2340/145* (2013.01)

(58) Field of Classification Search
None
See application file for complete search history.

(56) References Cited

PUBLICATIONS

Stefano Guidi, Iphone XS displayed for sale in store. New Apple iPhone . . . Sep. 21, 2016, Getty Images, https://www.gettyimages.com/detail/news-photo/iphone-xs-displayed-for-sale-in-the-store-new-apple-iphone-news-photo/1038380026?adppopup=true.*

* cited by examiner

*Primary Examiner* — Tuan S Nguyen
(74) *Attorney, Agent, or Firm* — Perkins Coie LLP; Michael Glenn

(57) ABSTRACT

Presented here are systems and methods to enable software applications to display images on irregular screen shapes containing the shape without display functionality. In one embodiment, the shape without display functionality is confined within a bounding shape, which, when subtracted from the irregular screen shape leaves a rectangular area of the screen where the image can be displayed. The area within the bounding shape can be occupied by images provided by the operating system associated with the irregular screen, such as a status bar and/or navigation bar. In another embodiment, the image can be displayed on the full irregular screen, such that the shape without display functionality covers a part of the image. When the occluded part of the image contains a critical object, such as a menu item, a button, etc., the image can be modified to move the critical object out of the area occluded by the shape without display functionality.

21 Claims, 15 Drawing Sheets

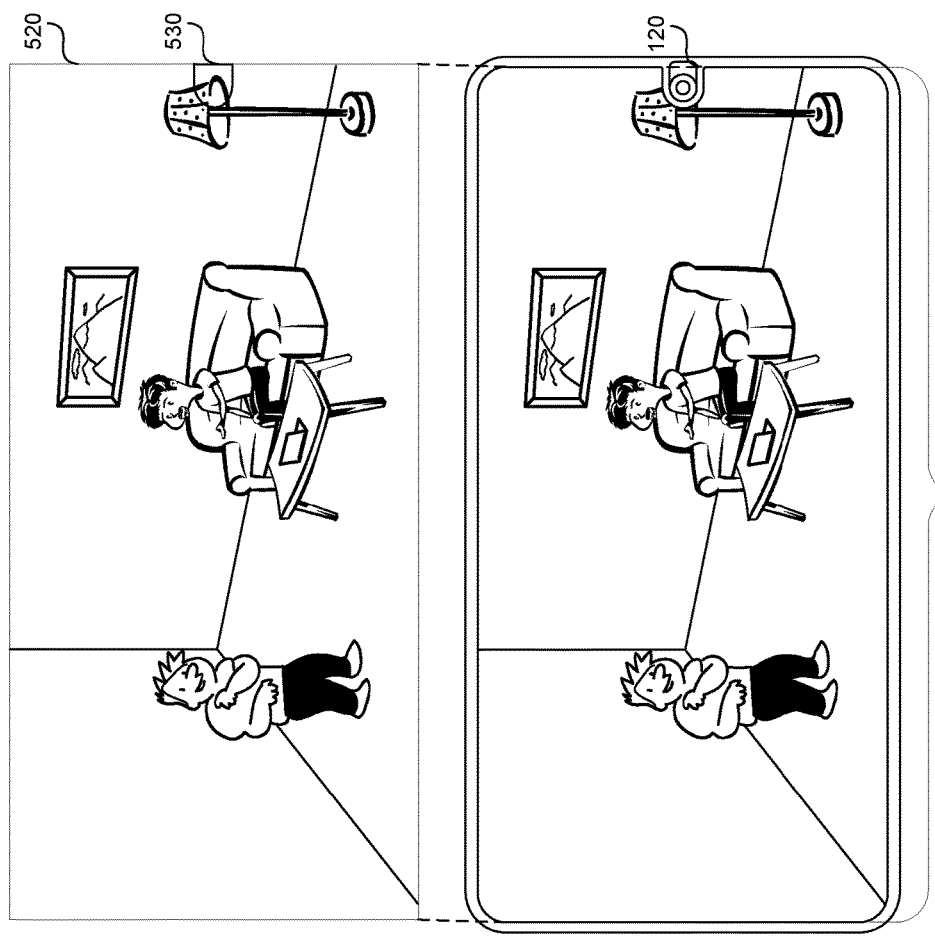

DISPLAYING AN IMAGE ON AN IRREGULAR SCREEN

CROSS-REFERENCE TO RELATED APPLICATIONS

This application is a continuation of the U.S. utility patent application claims Ser. No. 15/665,332, filed Jul. 31, 2017, which claims priority to the U.S. provisional patent application Ser. No. 62/531,560, filed Jul. 12, 2017, and to the U.S. provisional patent application Ser. No. 62/528,357, filed Jul. 3, 2017, all of which are incorporated in their entirety by this reference thereto.

TECHNICAL FIELD

The present application is related to electronic displays, and more specifically to methods and systems that display an image of an irregular screen.

BACKGROUND

Software applications running on various mobile devices expect a rectangular screen and are designed without compatibility deviations from this shape. They expect status bar at the top and navigation bar containing home, back, processes buttons at the bottom in portrait orientation or on the bottom/side in landscape orientation.

SUMMARY

Presented here are systems and methods to enable software applications to display images on irregular screen shapes containing the shape without display functionality. In one embodiment, the shape without display functionality is confined within a bounding shape, which, when subtracted from the irregular screen shape leaves a rectangular area of the screen where the image can be displayed. The area within the bounding shape can be occupied by images provided by the operating system associated with the irregular screen, such as a status bar and/or navigation bar. In another embodiment, the image can be displayed on the full irregular screen, such that the shape without display functionality covers a part of the image. When the occluded part of the image contains a critical object, such as a message, a menu item, a button, etc., the image can be modified to move the critical object out of the area occluded by the shape without display functionality.

BRIEF DESCRIPTION OF THE DRAWINGS

FIG. 5A-5D show an image displayed in fullscreen mode of the regular screen.

DETAILED DESCRIPTION

Figure 1:
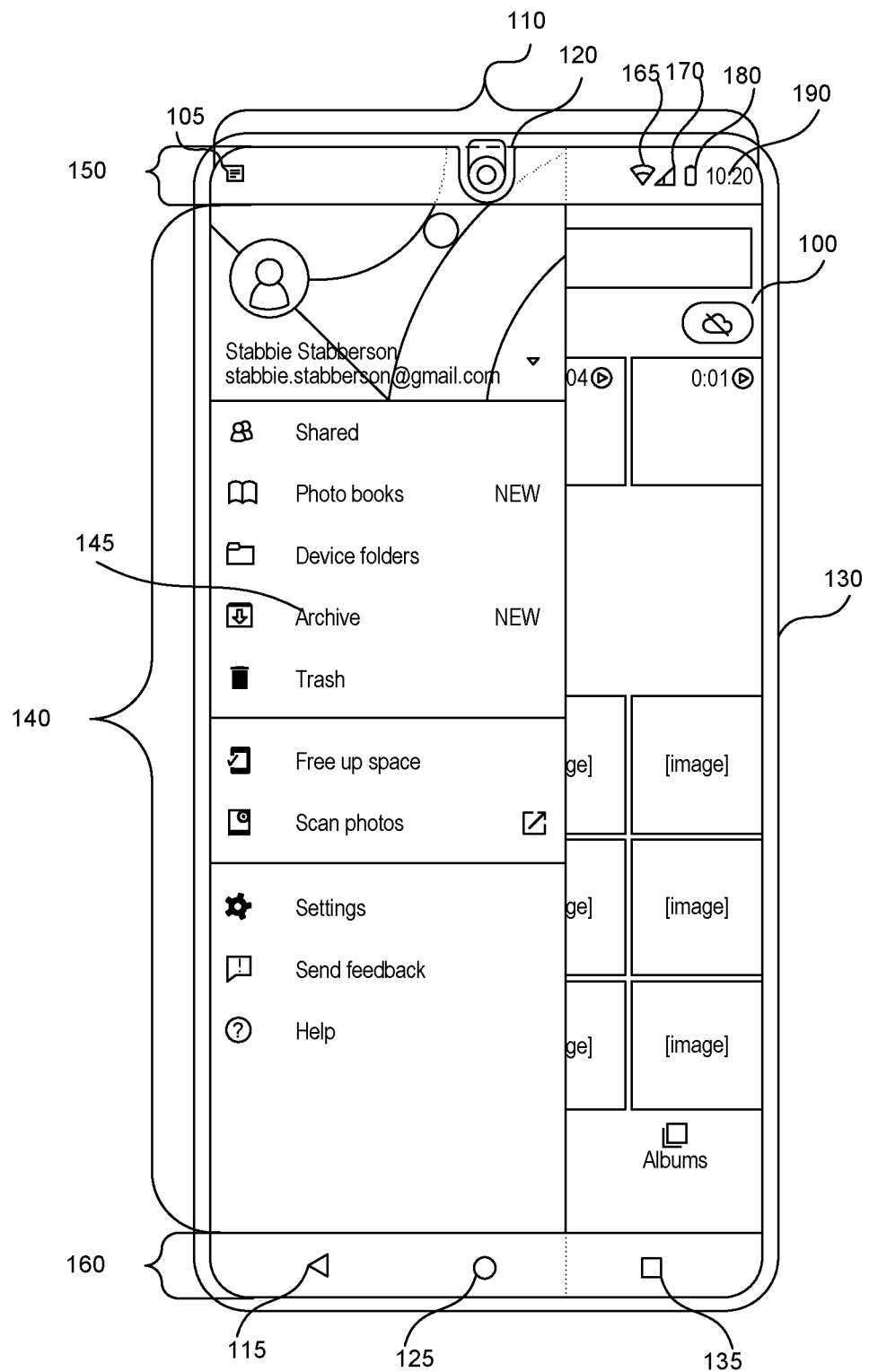
FIG. 1 shows a front view of a mobile device with an irregular screen.

Displaying an Image on an Irregular Screen

Presented here are system and methods to enable software applications to display images on irregular screen shapes containing the shape without display functionality. In one embodiment, the shape without display functionality is confined within a bounding shape, which, when subtracted from the irregular screen shape leaves a rectangular area of the screen where the image can be displayed. The area within the bounding shape can be occupied by images provided by the operating system associated with the irregular screen, such as a status bar and/or navigation bar. In another embodiment, the image can be displayed on the full irregular screen, such that the shape without display functionality covers a part of the image. When the occluded part of the image contains a critical object, such as a message, a menu item, a button, etc., the image can be modified to move the critical object out of the area occluded by the shape without display functionality.

Software applications running on various mobile devices expect a rectangular screen and are designed without compatibility deviations from this shape. They expect status bar at the top and navigation bar containing home, back, processes buttons at the bottom in portrait orientation or on the bottom/side in landscape orientation. Images provided by the applications can be displayed in three modes: (1) applications are displayed in the area on screen which is rectangular screen minus the status bar and navigation bar; (2) applications can request to be laid out in full screen with transparent status bar; (3) applications, such as games, can request full screen mode where the application takes up the full screen without status bar and navigation bar. In case (2), the applications put non-critical content, e.g. objects, like backgrounds or artwork underneath the status bar and navigation bar, and inset critical elements like messages and buttons within the area of the rectangular screen not occupied by the status bar and navigation bar.

When the screen is nonrectangular, and includes a shape without display functionality, a processor can configure the status bar in portrait orientation to completely include the shape without display functionality inside the status bar. The processor can modify the status bar to push critical objects contained in the status bar outside the shape without display functionality. The display with a modified status bar can be a default display for all applications. Applications in mode (1) and mode (2) can work as is in the remaining area of the screen. In landscape orientation, status bar returns to standard mode with standard height.

When an application requests to be laid out in mode (1), the application works as is in portrait orientation. In landscape orientation, the processor can put a bounding shape around the shape without display functionality to create a rectangular area of the screen that the application can use to display images.

When applications want to be laid out in mode (2), the processor can provide an opaque status bar at top instead of transparent status bar and provide the application with a rectangular screen area without intrusion from the notch. The rectangular screen area can be obtained by the processor limiting the application to the display area not occupied by the status bar.

When applications want to be laid out in mode (3), the processor can put the bounding shape containing a solid color, such as black, at the top of the screen in portrait orientation, or on the side of the screen in landscape orientation, and provide the application with a rectangular screen area without intrusion from the shape without the display functionality. The solid color of the bounding shape can be a color associated with the color scheme of the application. For example, if the application is Gmail, and the color scheme is red and white, the solid color can be red or white. In another example, the solid color of the bounding shape can be the color of the application that is closest, in terms of screen distance, to the bounding shape.

Some applications that work well in mode (2) or mode (3) are put in a permission list, i.e. a whitelists, that allows the applications to access full screen area. There can be multiple permission lists. One permission list can allow an application to utilize the full screen area in both landscape orientation and portrait orientation. Another permission list can only allow full screen in portrait orientation, but in landscape orientation, the processor puts the bounding shape around the shape without display functionality. Conversely, yet another permission list can only allow full screen in landscape orientation, but in portrait orientation, the processor puts the bounding box around the shape without display functionality.

Permission lists can be pre-populated based on testing and approval from the application developer. Permission lists can also be populated by a user configuring settings associated with the application, or permission lists can be populated dynamically at runtime by the user. Receiving an input from the user regarding display settings of an application, allows the user to choose the correct way of handling the shape without display functionality, based on circumstance and their preference.

FIG. 1 shows a front view of a mobile device with an irregular screen. The irregular screen 100 contains a nonrectangular display area 110 having display functionality. The nonrectangular display 110 area defines a shape without display functionality 120. The nonrectangular display area 110 covers substantially the full front side of the display device 130. The shape without display functionality 120 can contain a sensor, such as a camera, an ambient light sensor, a proximity sensor, etc. The shape without display functionality 120 can be placed at the edge of the screen 100, as shown in FIG. 1, the middle of the screen 100, the corner of the screen 100, etc. The shape without display functionality 120 can be any rectilinear shape, curvilinear shape, or a mix of a rectilinear shape and a curvilinear shape as shown in FIG. 1.

The irregular screen 100 can display one or more images 140, 150, 160. Image 140 can be provided by an application running on the mobile device 130. Images, 150, 160 can be provided by an operating system running on the mobile device 130. Images 150, 160 can be partially transparent to allow features of image 140 to be visible underneath images 150, 160, as shown in FIG. 1.

Image 150 can be the status bar containing objects such as an icon representing wireless reception 165, and icon representing cell phone reception 170, and icon representing battery power remaining 180, an icon representing time 190, icon representing unread messages 105, etc. Image 160 can be a navigation bar containing objects such as a back button 115, a home button 125, and a button 135 to list recent applications running on the mobile device 130. Object 145 contained in image 140 is considered to be critical, and cannot be obscured by the shape without display functionality 120. Object 145 can be a menu item, an icon, text, an animated object in the video, a message, a button, etc. An image can contain multiple objects that are considered critical.

Figure 2:
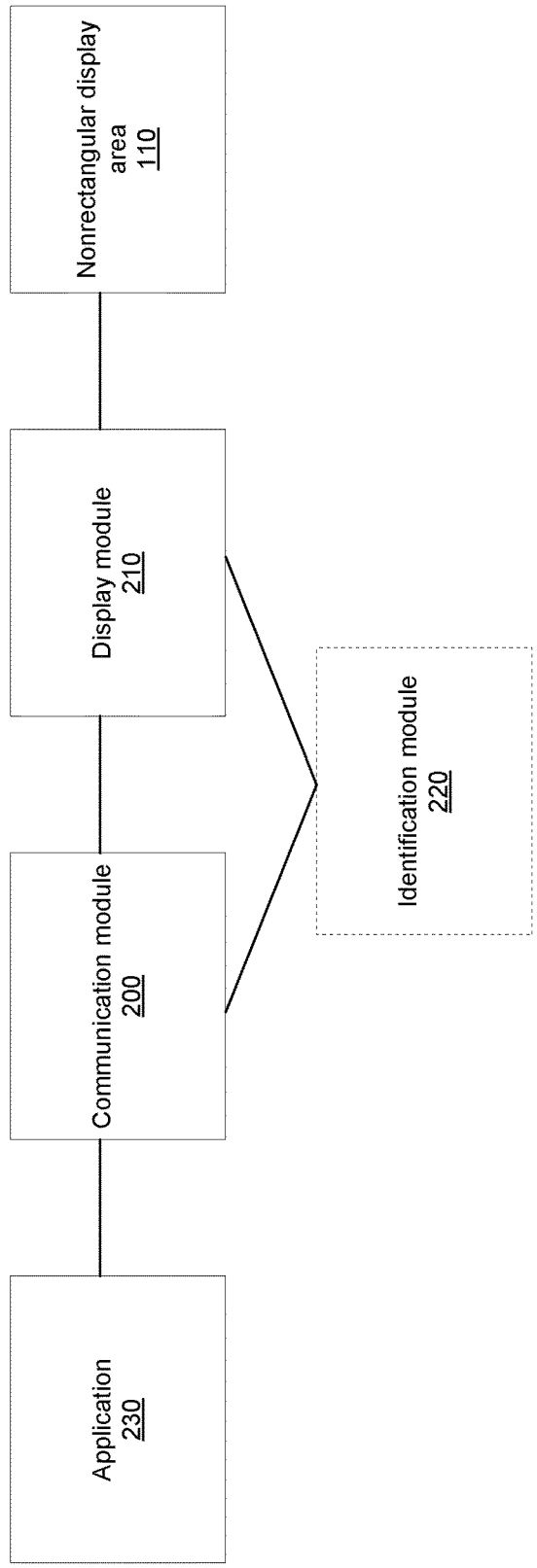
FIG. 2 shows a system to display an image within the irregular screen.

FIG. 2 shows a system to display an image within the irregular screen. The system contains a communication module 200, a display module 210, an optional identification module 220 in communication with the nonrectangular display area 110 and an application 230 providing the image 140 to the irregular screen 100.

The communication module 200 receives a first image, such as image 140 in FIG. 1, to display on the nonrectangular display area. The first image 140 includes a first critical object 145 in FIG. 1 occupying a first portion 155 in FIG. 1 of the first image 140.

The display module 210 displays the first image 140 on the nonrectangular display area 110 in FIG. 1 by modifying the first image 140 and placing the first critical object 145 on the nonrectangular display area, the first critical object 145 fully contained within the nonrectangular display area having display functionality. The first critical object 145 can be displayed within the nonrectangular display area 110 in FIG. 1, without moving the first critical object 145 in relation to the first image 140.

The identification module 220 identifies the first critical object 145 within the image that is considered critical. The identification module 220 can identify the critical objects by the object type, such as a menu item, an icon, a text, an animated object in a video, a message, a button, etc. Further, the identification module 220 can identify the critical objects by identifying various objects contained in the image 140 and associating identification labels with them using image recognition algorithms such as machine learning models. Noncritical objects tend to be backgrounds or artwork associated with the image 140. An image can contain multiple objects that are considered critical.

Figure 3A:
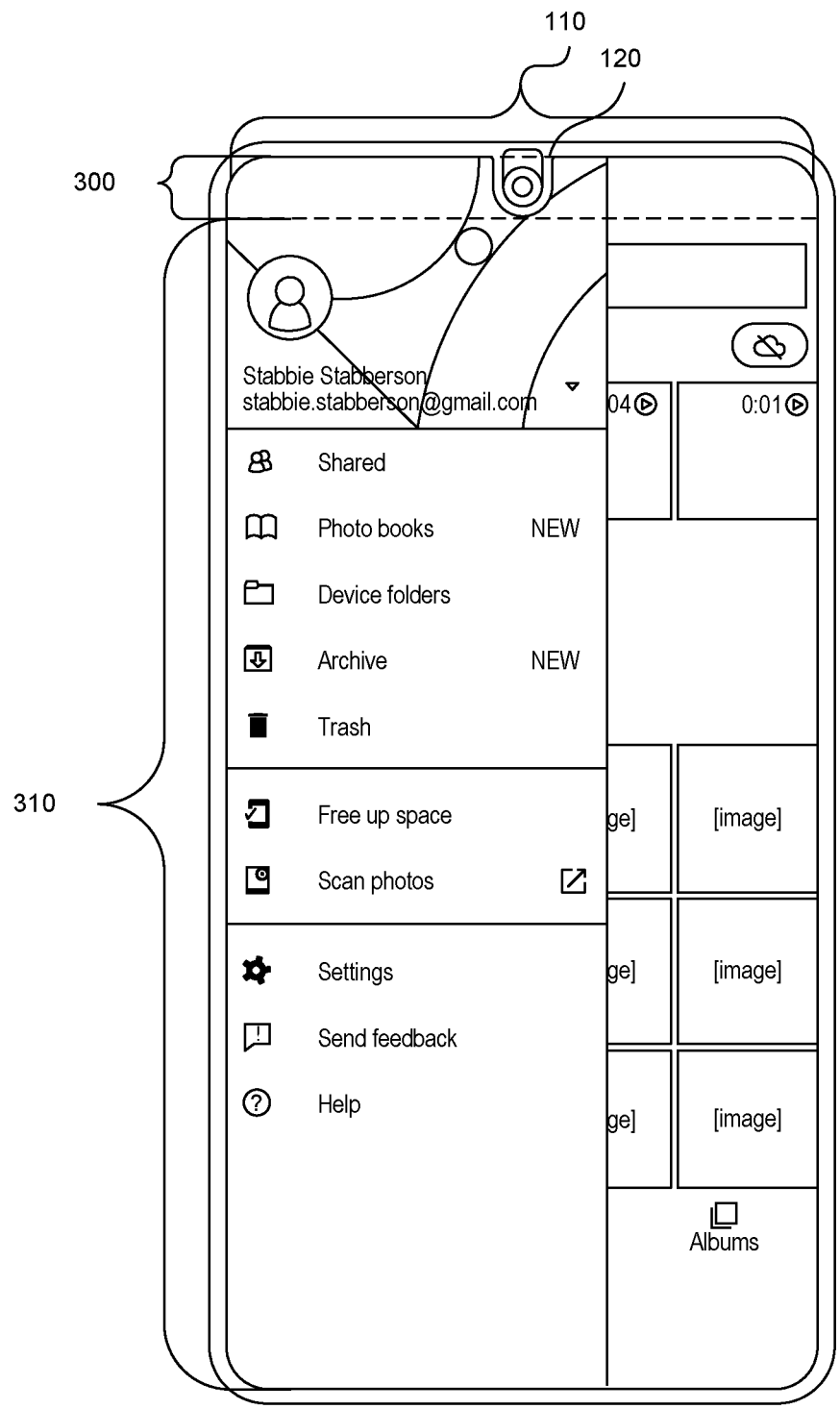
FIGS. 3A-3B show a bounding shape in various orientations of the irregular screen.
Figure 3B:
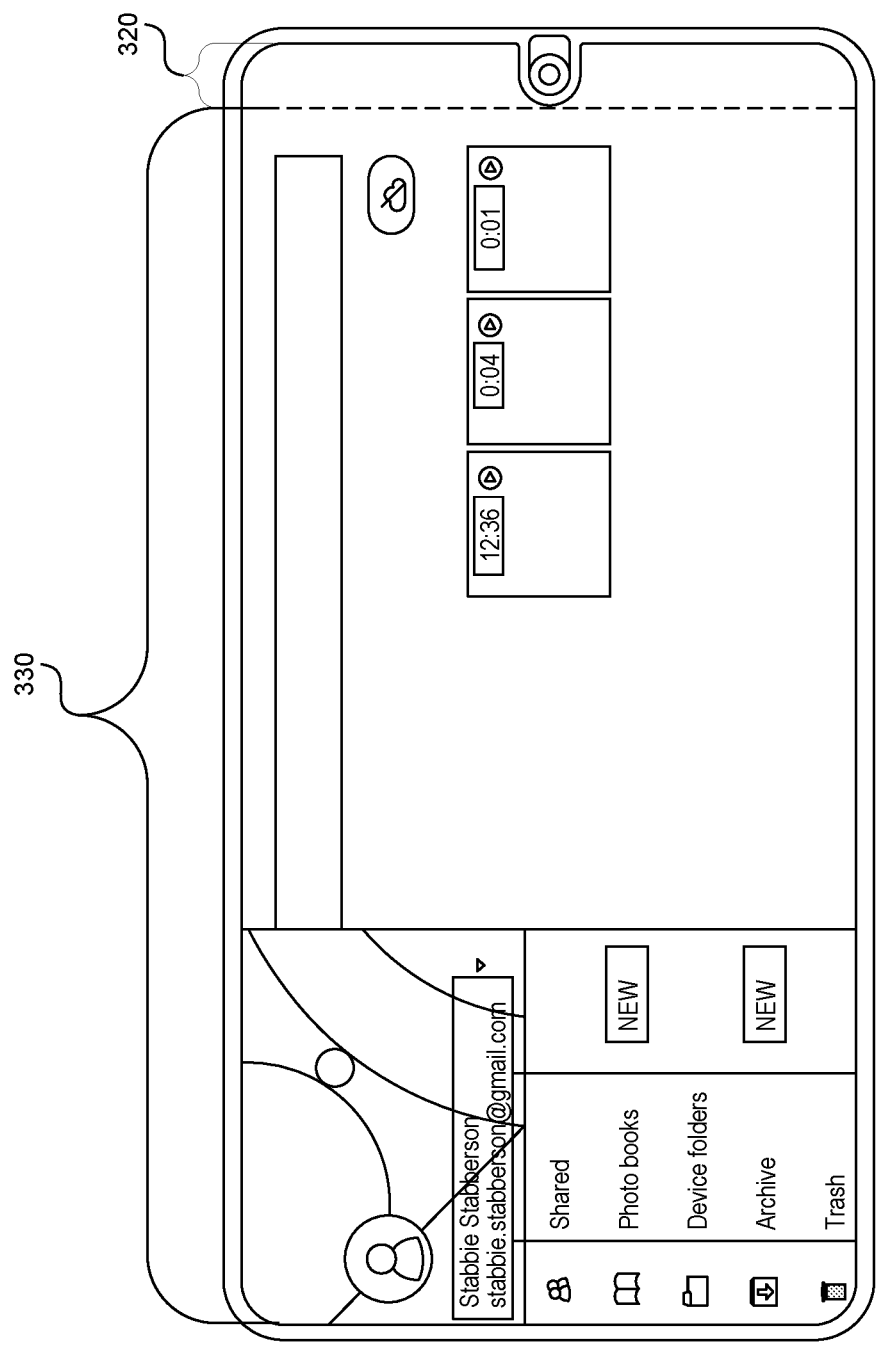

FIGS. 3A-3B show a bounding shape in various orientations of the irregular screen. FIG. 3A shows a portrait orientation of the irregular screen 100 in FIG. 1, while FIG. 3B shows a landscape orientation of the irregular screen 100. The display module 210 in FIG. 2 determines a bounding shape 300 in FIG. 3A, or 320 in FIG. 3B containing the shape without display functionality 120. The display module 210 defines a rectangular display area 310 in FIG. 3A, or 330 in FIG. 3B by subtracting the bounding shape 300, 320, respectively, from the nonrectangular display area 110. The bounding shape 300, 320 can be calculated so that the rectangular display area 310, 330 is maximized. The display module 210 displays the image on the rectangular display area 310, 330.

Figure 4A:
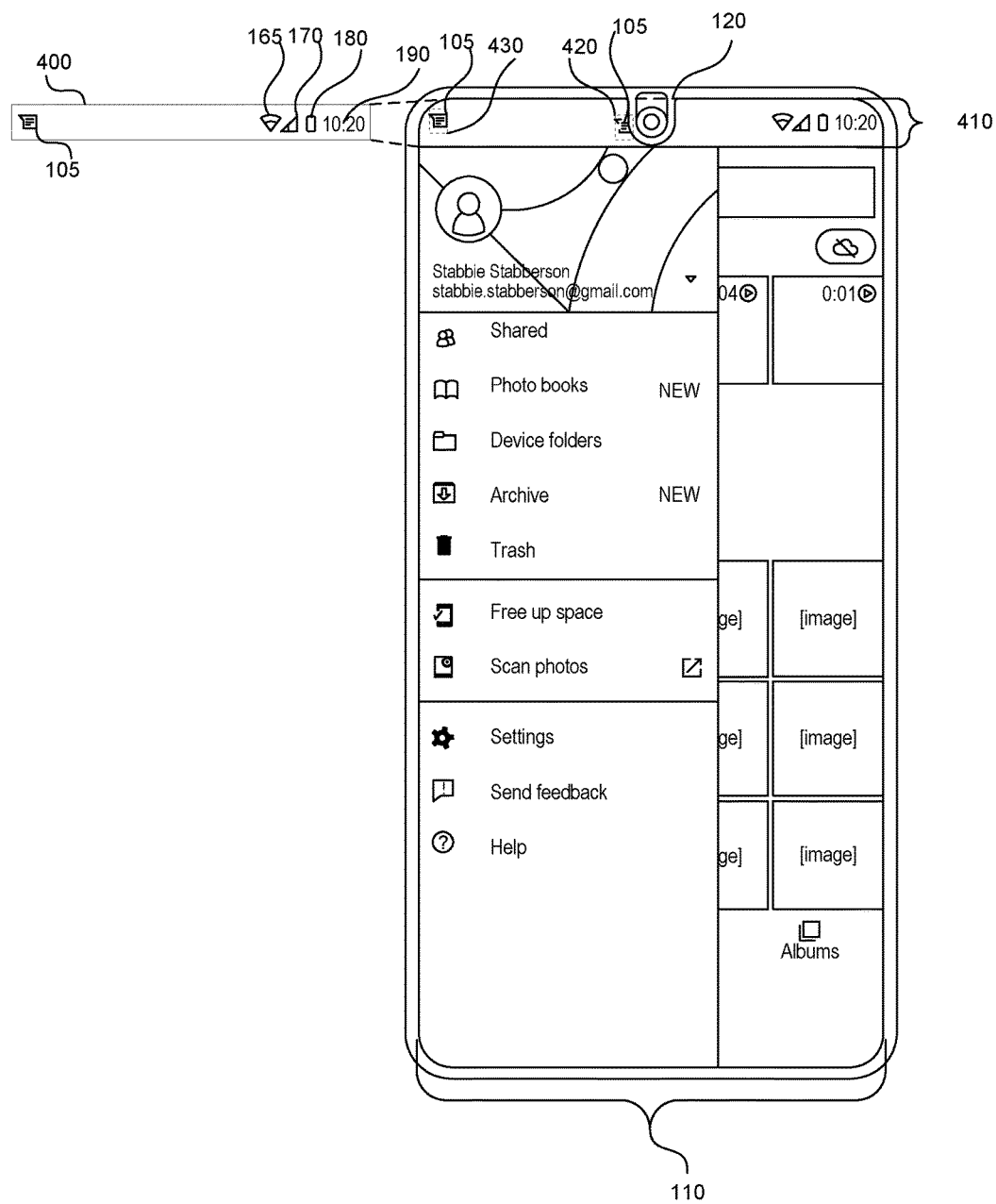
FIGS. 4A-4C show a status bar displayed on the irregular screen.
Figure 4B:
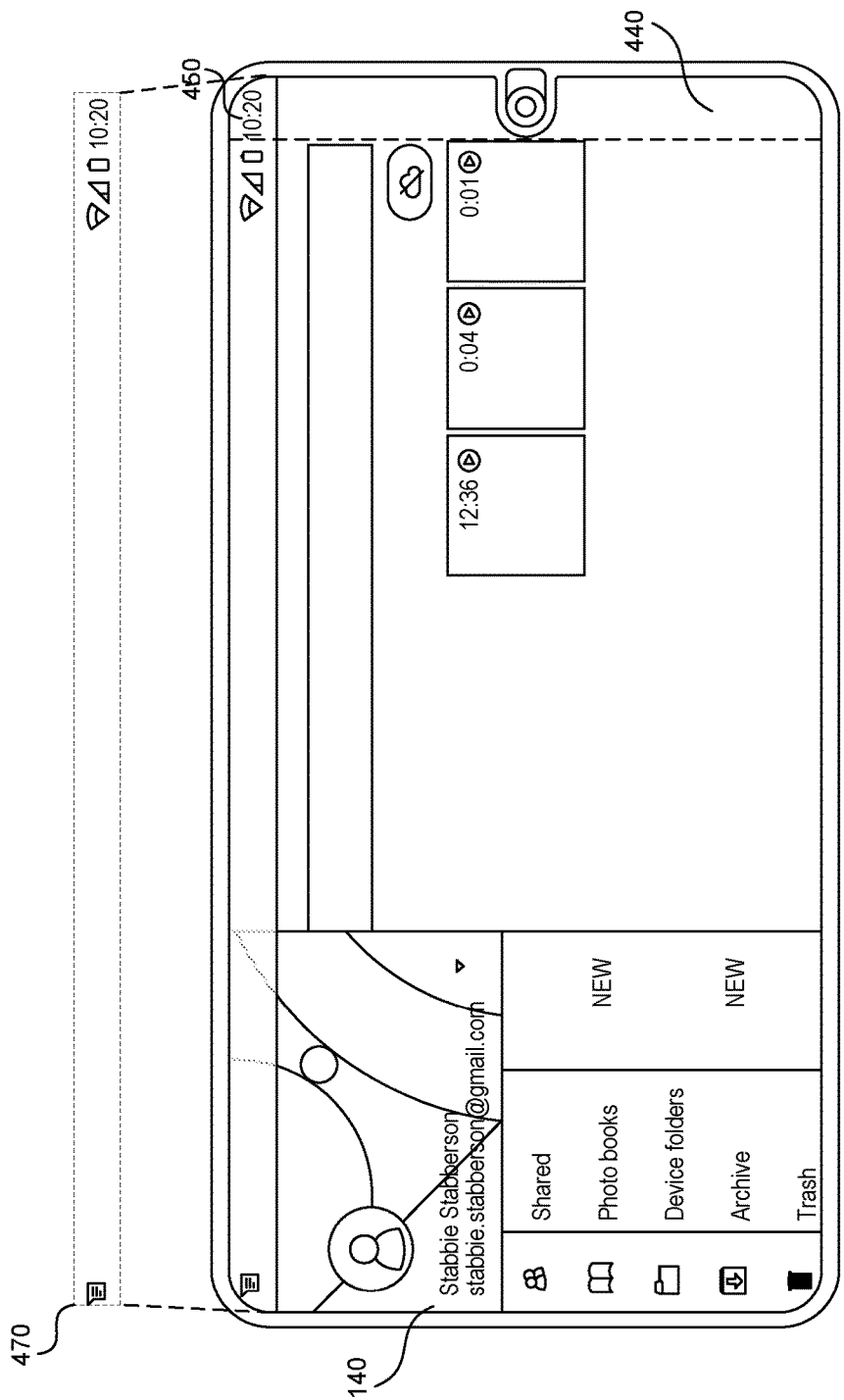
Figure 4C:
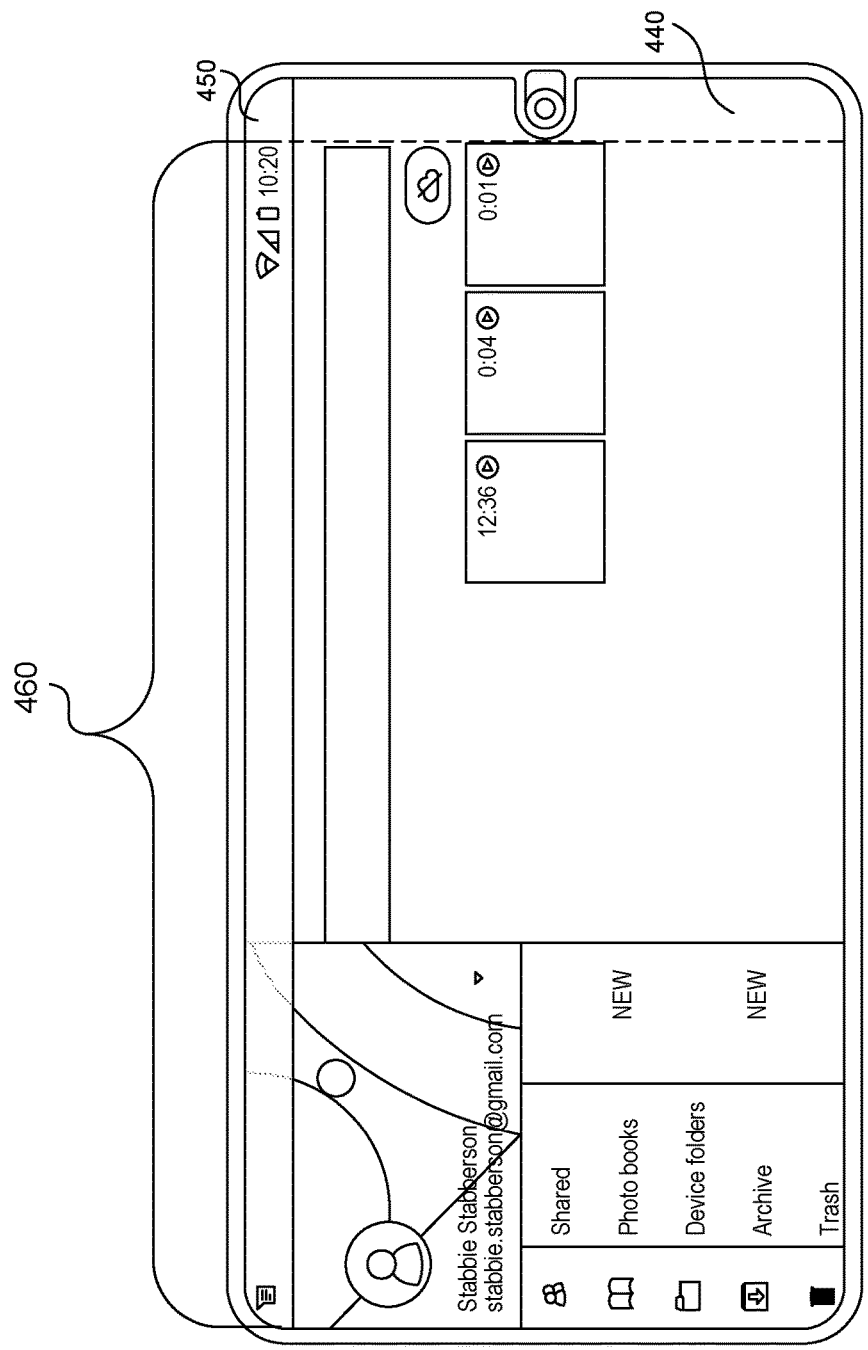

FIGS. 4A-4C show a status bar displayed on the irregular screen. FIG. 4A shows a portrait orientation of the irregular screen 100, while FIG. 4B shows a landscape orientation of the irregular screen 100. The communication module 200 receives a second image 400, 470 to display on the nonrectangular display area 110. The second image 400, 470 can be the status bar image 150 in FIG. 1, and/or the navigation bar image 160 in FIG. 1. The second image 400, 470 includes one or more critical objects occupying a portion of the second image 400, 470. The critical objects can be icons such as an icon representing wireless reception 165, an icon representing cell phone reception 170, an icon representing battery power remaining 180, an icon representing time 190, an icon representing unread messages 105, etc. The critical objects cannot be occluded by the shape without display functionality 120.

In portrait mode shown in FIG. 4A, the display module 210 determines a position of the second image 400, 470 on the nonrectangular display area, wherein the position encompasses the shape without display functionality 120. When any one of the critical objects 165, 170, 180, 190, 105 at least partially overlaps the shape without display functionality 120, the display module 210 modifies the second image 400 by moving the overlapping critical object to a different portion of the second image 400 to obtain a modified image 410. The display module 210 displays the modified image 410 on the nonrectangular display area 110. The display module 210 can make the modified image 410 partially transparent when displayed on the nonrectangular display area 110, as shown in FIG. 1, or the display module 210 can make the modified image 410 opaque as shown in FIG. 4A.

For example, in FIG. 4A, critical object 105 in the default position occupies a portion 420 of the nonrectangular display area 110, and overlaps the shape without display functionality 120. The display module 210 determines an offset from the default portion 420 to locate a different portion 430 of the second image 400. The different portion 430 of the second image 400 does not overlap the shape without display functionality 120. The offset between default portion 420 and the different portion 430 can be a minimal such that the critical object 105 does not overlap the shape without display functionality 120, or, the offset can be greater than the minimal offset in order to create a pleasing layout of the critical objects within the nonrectangular display area 110.

In landscape mode shown in FIG. 4B, the display module 210 can display the second image 470 without modification when the second image 470 does not overlap the shape without display functionality. In landscape mode, the display module 210 can optionally create a bounding shape 440 in which the image 140 is not displayed. The second image 470 can be overlaid with the bounding shape 440, as shown in FIG. 4B. For example, the second image 470 can be partially transparent in the region 450 overlapping the bounding shape 440, or the second image 470 can be fully opaque in the region 450 overlapping the bounding shape 440. The second image 470 can be confined to the rectangular display area 460 outside of the bounding shape 440, as shown in FIG. 4C, leaving the region 450 occupied by the bounding shape 440. The bounding shape 440 can display a solid color, such as black. The solid color of the bounding shape can be a color associated with the color scheme of the application. For example, if the application is Gmail, and the color scheme is red and white, the solid color can be red or white. In another example, the solid color of the bounding shape can be the color of the application that is closest, in terms of screen distance, to the bounding shape.

Figure 5A:
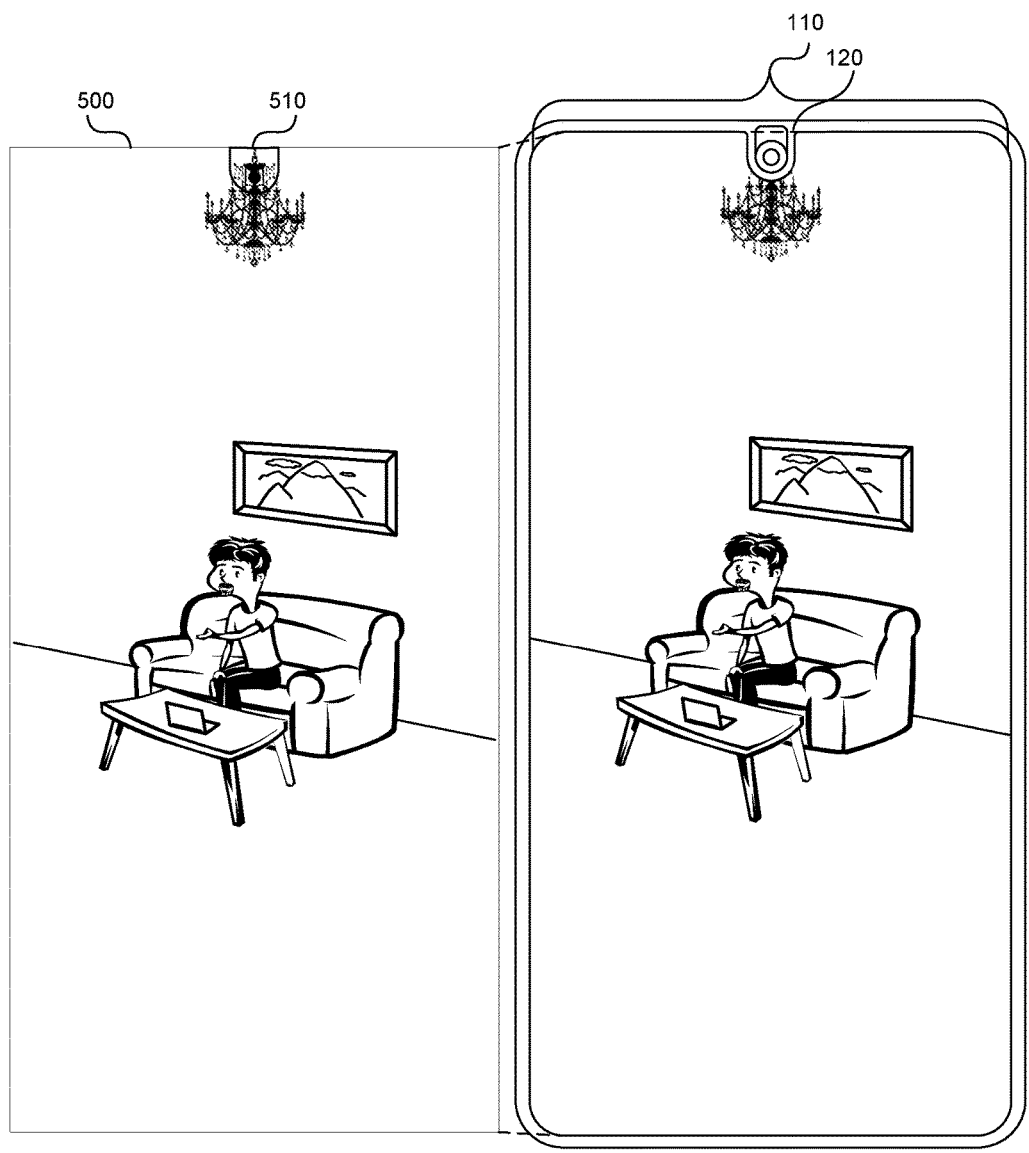
Figure 5B:
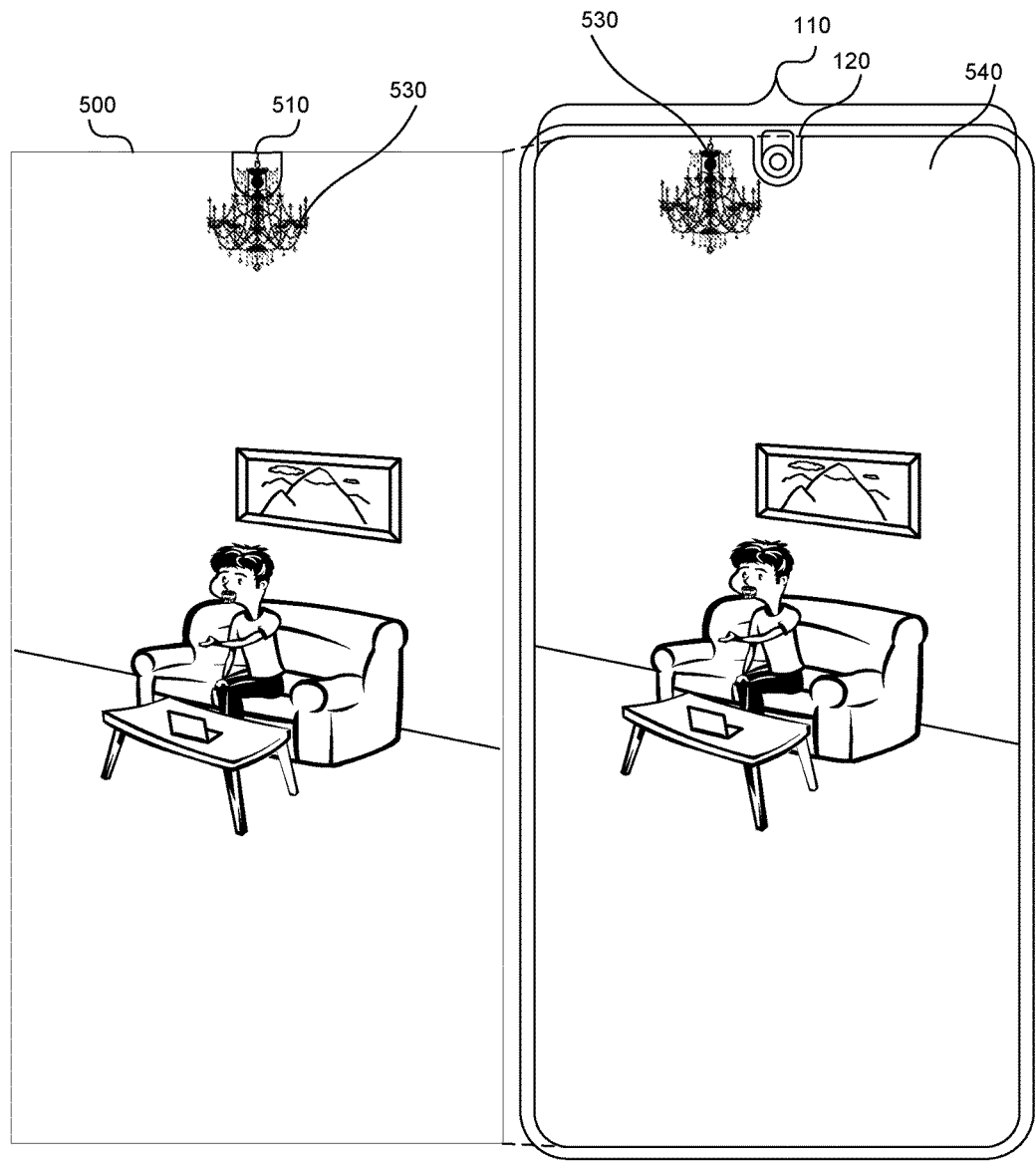

FIG. 5A-5D show an image displayed in fullscreen mode of the regular screen. FIG. 5A shows the nonrectangular display area oriented in portrait mode, while FIG. 5B shows the nonrectangular display area 110 oriented in landscape mode. The communication module 200 in FIG. 2 receives a request from an application 230 in FIG. 2 to display the first image 500 on the full nonrectangular display area 110. The display module 210 in FIG. 2 checks a permission list indicating whether the application 230 has permission to utilize the full nonrectangular display area 110 in a given orientation. Upon confirming that the application 230 is included in the permission list, the display module 210 displays the first image 500 on the full nonrectangular display area 110. As can be seen in FIG. 5A, a part 510 of the first image 500 is occluded by the shape without display functionality 120.

In one embodiment, the display module 210 checks whether the part 510 occluded by the shape without display functionality 120 contains a critical object. When the occluded part 510 contains a non-critical object, or no objects at all, the display module 210 does not modify the first image 500, as shown in FIG. 5A. As shown in FIG. 5B, when the occluded part 510 contains a critical object 550, the display module can modify the first image 500 to position the critical object 550 away from the shape without display functionality 120, to obtain image 540, as shown in FIG. 5B. The movement of the critical object 550 can be calculated to be the minimal movement, which places the critical object 550 fully within the nonrectangular display area 110.

In FIG. 5C the nonrectangular display area 110 is oriented in landscape mode, and a different part 530 of the image 520, is obscured by the shape without display functionality 120. The permission list can be specific to the orientation of the nonrectangular display area 110. For example an application 230 can be allowed to display the image 500 in fullscreen mode in portrait orientation, but can be prevented from displaying the image 520 in fullscreen in landscape orientation. Conversely, an application can be allowed display the image 520 in fullscreen mode in landscape orientation, but can be prevented from displaying the image 500 in fullscreen mode in portrait orientation. Some applications 230 can be allowed to utilize the fullscreen in both portrait orientation and landscape orientation.

Figure 5D:
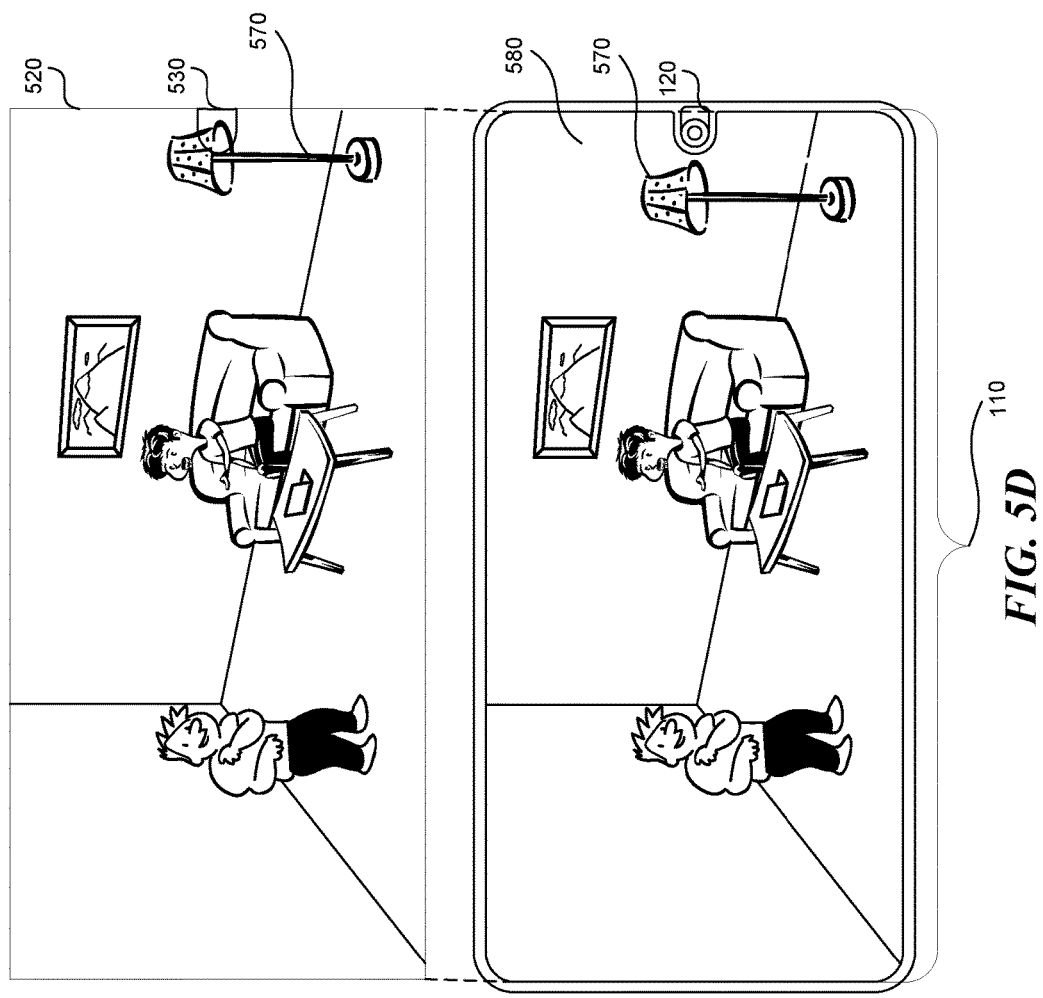

Similarly to portrait orientation, in one embodiment, the display module 210 checks whether the part 530 occluded by the shape without display functionality 120 contains a critical object. When the occluded part 530 contains a non-critical object, or no objects at all, the display module 210 does not modify the first image 520, as shown in FIG. 5C. As shown in FIG. 5D, when the occluded part 530 contains a critical object 570, the display module can modify the first image 520 to position the critical object 570 away from the shape without display functionality 120, to obtain image 580, as shown in FIG. 5D. The movement of the critical object 570 can be calculated to be the minimal movement, which places the critical object 570 fully within the nonrectangular display area 110.

Figure 6:
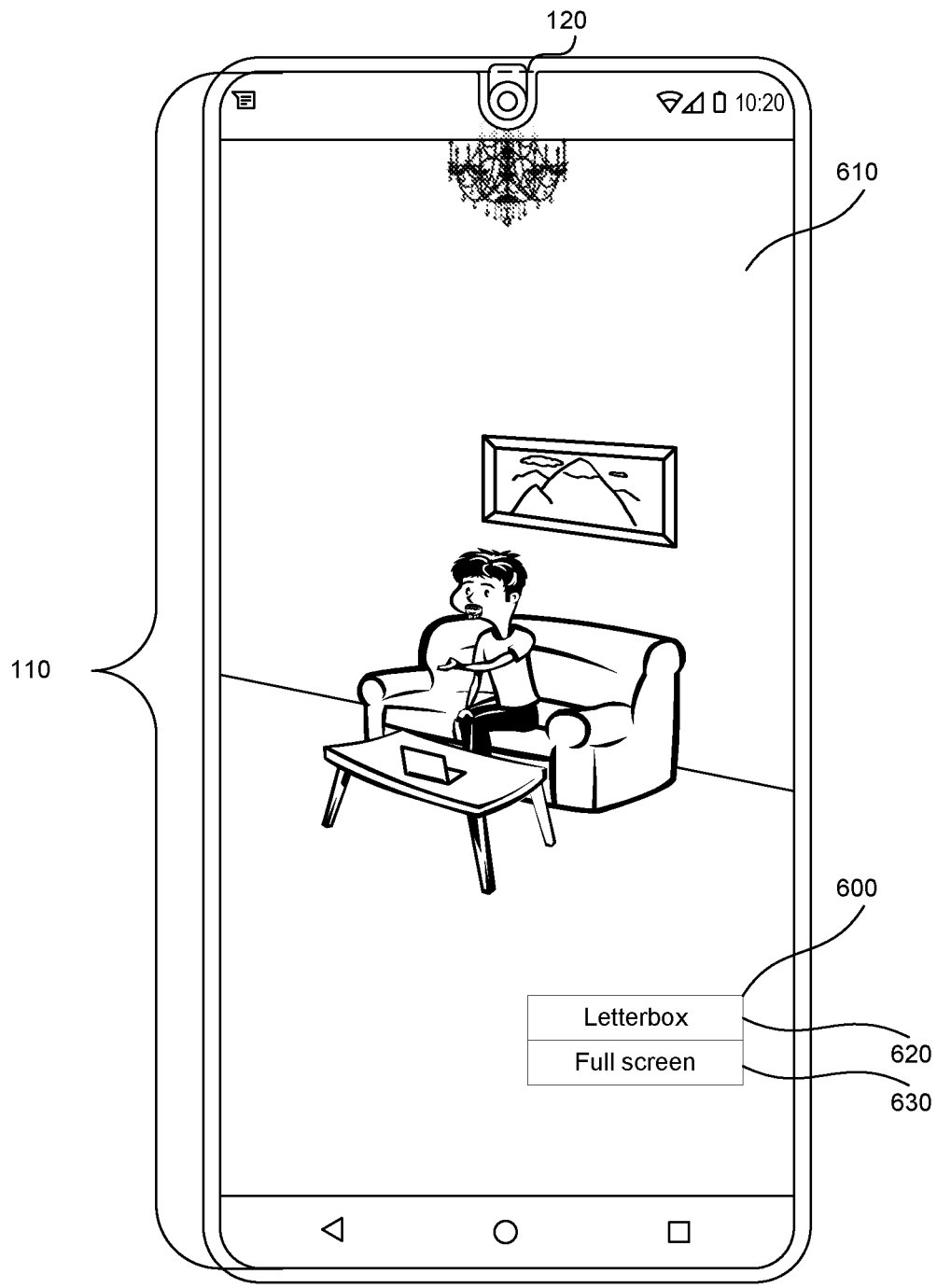
FIG. 6 shows a widget allowing the user to adjust a position of an image within the nonrectangular display area.

FIG. 6 shows a widget allowing the user to adjust a position of an image within the nonrectangular display area. The communication module 200 in FIG. 2 provides an application 230 in FIG. 2 associated with a user, a widget 600 to adjust a position of the first image 610 within the nonrectangular display area 110. The widget 600 can be a list as shown in FIG. 6, or the widget can be a designated area of the nonrectangular display area 110 that when selected allows the user to position the image within the nonrectangular display area 110 by dragging the image on the nonrectangular display area 110.

Once the user specifies a preferred position 620, 630 of the first image 610, the communication module 200 receives from the application 230 the preferred position 620, 630 associated with the application 230. The preferred position 620 "letterbox" communicates to the display module 210 in FIG. 2 that a bounding shape 300 in FIG. 3A, 320 in FIG. 3B 440 in FIG. 4, should be placed around the shape without the display functionality 120. The preferred position 630 communicates to the display module 210 that the application 230 can access the fullscreen of the nonrectangular display area 110. The preferred position can also allow the user to position the first image 610 so that the image 610 occupies only a part of the nonrectangular display 110. For example, the user can drag the image to the left half of the screen, leaving the right half of the screen occupied by a different image, such as a desktop background, black background, etc. The display module 210 displays the first image 610 in the preferred position specified by the user.

The communication module 200 can track the preferred position 620, 630 associated with the application 230 from multiple users specifying multiple different preferred positions. From the multiple different preferred positions, the display module 210 determines a best preferred position, which is specified by the highest number of users as the preferred position. The display module 210 sets the best preferred position to be the default mode in which the application 230 is displayed.

Figure 7:
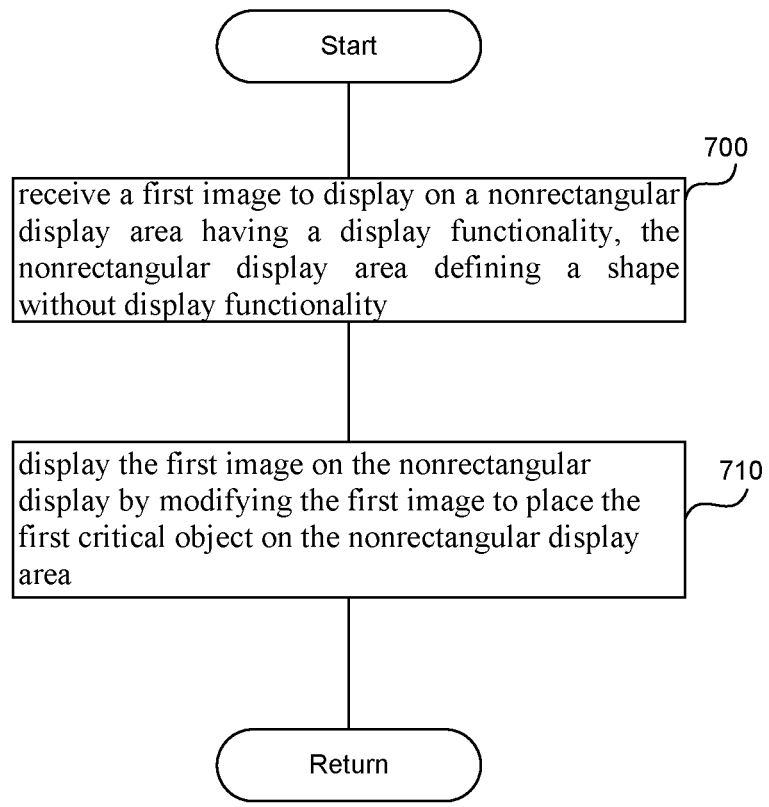
FIG. 7 is a flowchart of a method to display an image on a nonrectangular display area, according to one embodiment.

FIG. 7 is a flowchart of a method to display an image on a nonrectangular display area, according to one embodiment. In step 700, a processor receives a first image 140 in FIG. 1, 500 and FIG. 5, 610 in FIG. 6 to display on a nonrectangular display area 110 in FIG. 1 having a display functionality. The nonrectangular display area 110 defines a shape without display functionality 120 in FIG. 1. The first image 140, 500, 520, 610 includes a first critical object 145 occupying a first portion of the first image. The first image can include multiple critical objects. In step 710, the processor displays the first image 140, 500, 520, 610 on the nonrectangular display 110 by modifying the first image 140, 500, 520, 610 to place the first critical object 145 on the nonrectangular display area 110. The first critical object 145 is fully contained within the nonrectangular display area having display functionality, without overlapping the shape without display functionality 120.

To modify the first image 140, 500, 610, the processor can determine a bounding shape 300 and FIG. 3, 440 in FIG. 4A-4B containing the shape without display functionality 120. The processor, then, defines a rectangular display area 310 in FIG. 3A, 320, in FIG. 3B, 450 FIG. 4B, by subtracting the bounding shape 300, 320, 440 from the nonrectangular display 110. The resulting rectangular display area 310, 330, 450 can be the maximum rectangular display area not containing the shape without display functionality 120. The processor displays the first image 140, 500, 520, 610 within the rectangular display area 310, 330, 450.

To modify the first image 140, 500, 610, the processor can receive a request from an application 230 in FIG. 2 to display the first image 140, 500, 520, 610 on the full nonrectangular display area 110. Before responding affirmatively to the request, the processor can check a permission list indicating whether the application 230 has permission to utilize the full nonrectangular display area 110. Upon confirming that the application 230 is included in the permission list, the processor can display the first image 140, 500, 520, 610 on the full nonrectangular display area 110. When the first image 140, 500, 520, 610 is displayed on the full nonrectangular display area 110, a part 510, 530 in FIG. 5 of the first image 140, 500, 520, 610 is occluded by the shape without display functionality 120. If the parts 510, 530 to be occluded are determined to contain a critical object, the processor can move the critical object so that the critical object is not occluded by the shape without display functionality 120.

To modify the first image 140, 500, 610, the processor can determine an orientation of the nonrectangular display area 110. The orientation can be a portrait orientation and a landscape orientation. Based on the orientation of the nonrectangular display area 110, the processor can modify at least one of the first image 140, 500, 520, 610 or the nonrectangular display area 110.

For example, to modify the first image 140, 500, 610, based on the orientation, the processor can receive a request from an application 230 to display the first image 140, 500, 520, 610 on the full nonrectangular display area 110. The processor can check a permission list associated with the orientation of the nonrectangular display area 110. The permission list can indicate whether the application 230 has permission to utilize the full nonrectangular display area 110 when the nonrectangular display area 110 is associated with the determined orientation. Upon confirming that the application 230 is included in the permission list associated with the orientation of the nonrectangular display area, the processor can display the first image 140, 500, 520, 610 on the full nonrectangular display area 110. Parts 510, 530 of the first image 140, 500, 520, 610 can be occluded by the shape without display functionality 120.

As explained in this application, the permission list can be orientation dependent. One permission list can only allow full screen in portrait orientation, but in landscape orientation, the processor puts the bounding shape around the shape without display functionality 120, and allows the application 230 only to access the rectangular display area 330, 450. Conversely, another permission list can only allow full screen in landscape orientation, but in portrait orientation, the processor puts the bounding box around the shape without display functionality 120, and allows the application 230 only to access the rectangular display area 310.

In addition to step 700 and, 710 above, the processor can also receive a second image 400 in FIG. 4A, 470 in FIG. 4B, to display on the nonrectangular display area 110. The second image 400, 470 includes a second critical object 165, 170, 180, 190, 105 in FIG. 1, occupying a portion of the second image 400, 470. The processor determines a position of the second image 400, 470 on the nonrectangular display area 110 such that the position encompasses the shape without display functionality 120. When the second critical object 105 at least partially overlaps the shape without display functionality 120 in the default position 420, the processor modifies the second image 400 by moving the second critical object to a different portion 430 of the second image 400. When the second critical object 105 does not overlap the shape without display functionality 120, the processor can leave the second image 470 unmodified. The different portion 430 of the second image 400 does not overlap the shape without display functionality 120. The processor displays the modified image 410 on the nonrectangular display area 110. The second image 400, 470 can be a mobile device status bar 150 in FIG. 1, 400 in FIG. 4A, 470 in FIG. 4B, a mobile device navigation bar 160 FIG. 1, an image supplied by the operating system of the device, and/or an image supplied by the application 230, etc. The processor can transparently overlay the second image 400, 470 on the first image 140, 500, 610.

The processor can identify the first critical object within the image. The first critical object can be a menu item, a graphical user interface button, or a shape recognized by an image recognition algorithms such as a machine learning algorithm. For example the first critical object can be a human face, an animal, a flower, etc.

The processor can provide to an application 230 associated with a user a widget 600 in FIG. 6 to adjust a position of the first image 140, 500, 520, 610 within the nonrectangular display area 110. The widget 600 can be a list, a widget receiving a gestural input, a voice activated widget, etc. The processor receives from the application 230 a preferred position 620, 630 in FIG. 6 associated with the application 230. The processor displays the first image 140, 500, 520, 610 in the preferred position 620, 630.

Further, the processor can track the preferred position associated with the application 230 specified by multiple users defining multiple preferred positions. The processor can determine the best preferred position, which is a position specified by the highest number of users as the preferred position. The processor can create a default position for all the users to be the best preferred position, so that when a user has not defined a preferred position, the processor displays the image 140, 500, 520, 610 in the best preferred position.

Figure 8:
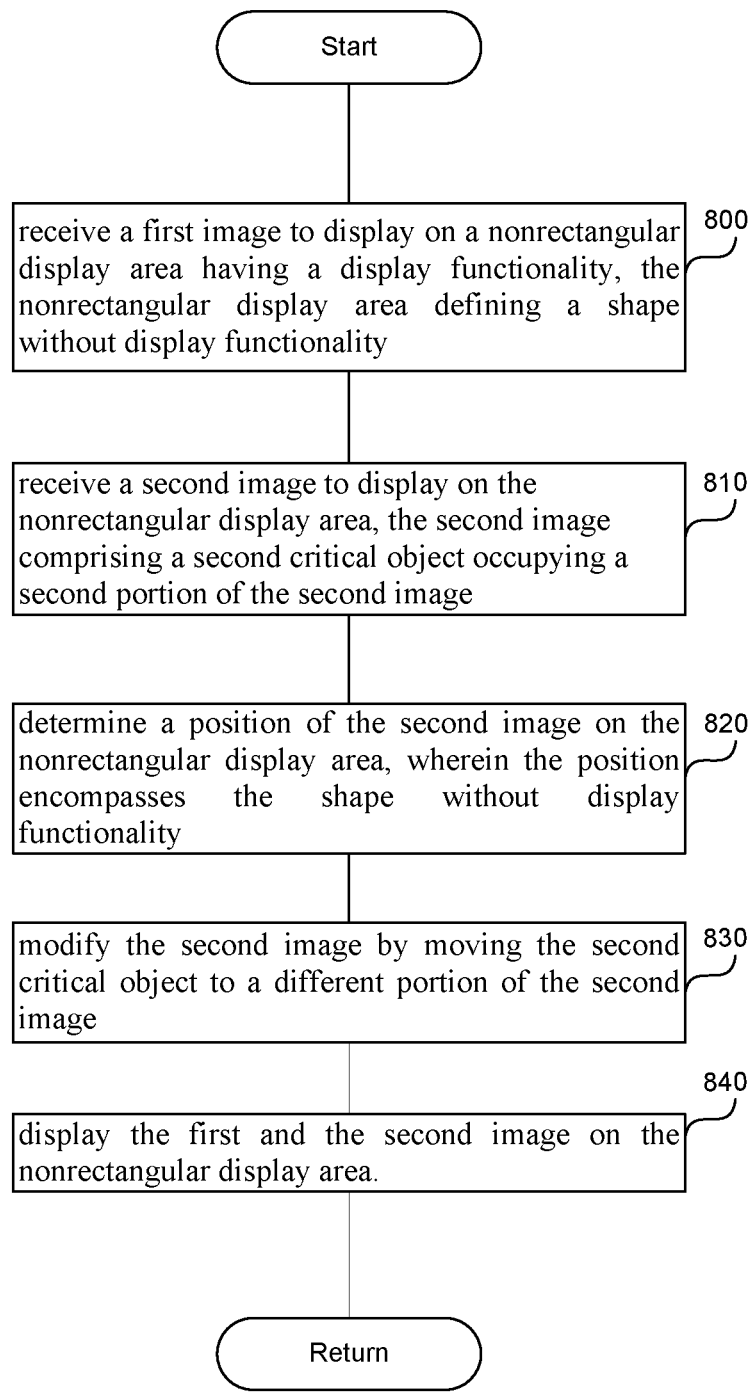
FIG. 8 is a flowchart of a method to display an image on a nonrectangular display area, according to another embodiment.

FIG. 8 is a flowchart of a method to display an image on a nonrectangular display area, according to another embodiment. In step 800, processor receives a first image 140 in FIG. 1, 500 and FIG. 5, 610 in FIG. 6 to display on a nonrectangular display area 110 in FIG. 1 having a display functionality. The nonrectangular display area 110 defines a shape without display functionality 120 in FIG. 1. The first image 140, 500, 520, 610 includes a first critical object 145 occupying a first portion of the first image. The first image can include multiple critical objects.

In step 810, the processor receives a second image 400 in FIG. 4A, 470 in FIG. 4B, to display on the nonrectangular display area 110. The second image 400, 470 includes a second critical object 165, 170, 180, 190, 105 in FIG. 1 occupying a second portion of the second image 400, 470.

In step 820, the processor determines a position of the second image 400, 470 on the nonrectangular display area 110 such that the position encompasses the shape without display functionality 120. In step 830, when the second critical object 105 at least partially overlaps the shape without display functionality 120 in the default position 420, the processor modifies the second image 400 by moving the second critical object to a different portion 430 of the second image 400. The different portion 430 of the second image 400 does not overlap the shape without display functionality 120.

In step 830, the processor displays the first image 140, 500, 520, 610 and the second image 400, 470 on the nonrectangular display area 110. The first critical object 145 and the second critical object 165, 170, 180, 190, 105 are fully contained in the in the nonrectangular display 110 area having display functionality.

Computer

Figure 9:
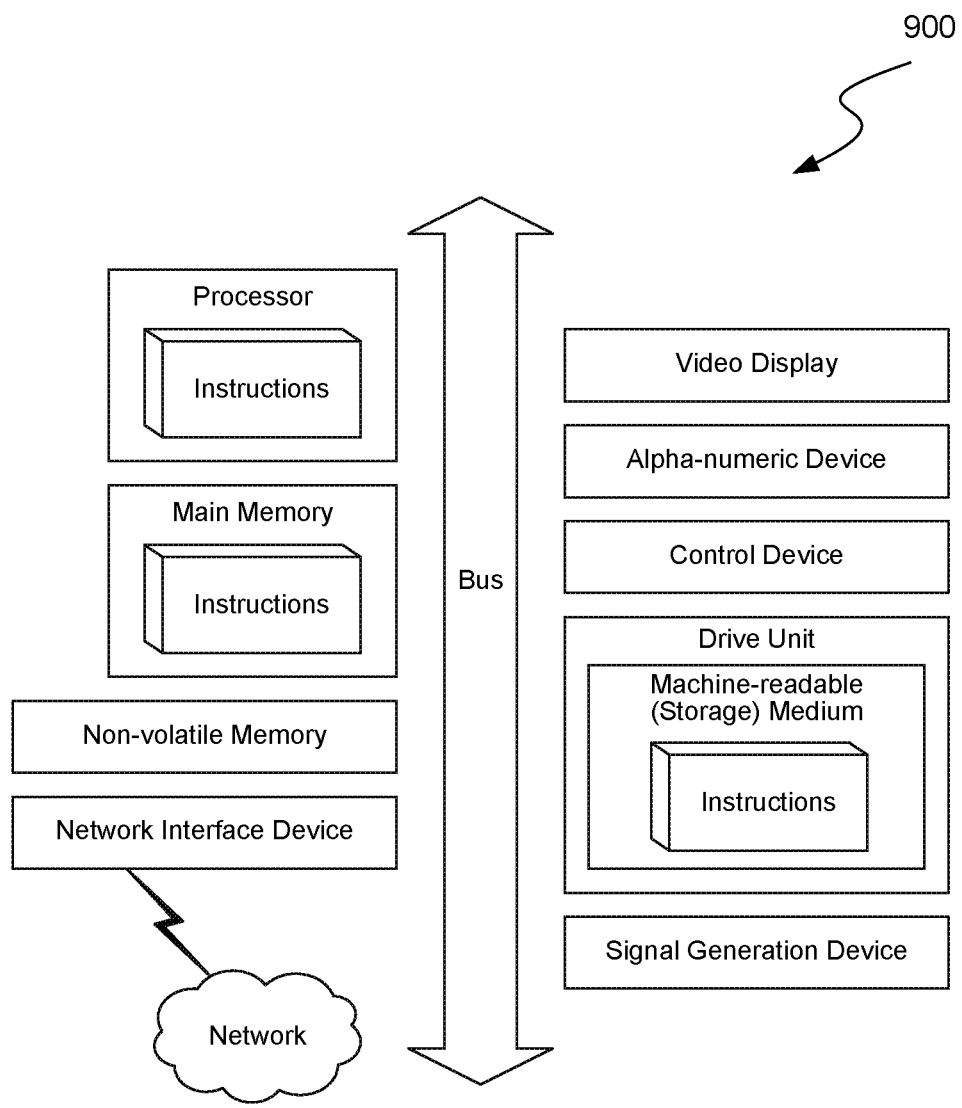
FIG. 9 is a diagrammatic representation of a machine in the example form of a computer system within which a set of instructions, for causing the machine to perform any one or more of the methodologies or modules discussed herein, may be executed.

FIG. 9 is a diagrammatic representation of a machine in the example form of a computer system 900 within which a set of instructions, for causing the machine to perform any one or more of the methodologies or modules discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

The processor in FIG. 9 can be the processor on which the communication module 200 in FIG. 2 the display module 210 in FIG. 2, the identification module 220 in FIG. 2, and the application 230 in FIG. 2 operate. The video display in FIG. 9 can be the nonrectangular display area 110 in FIG. 1.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to display an image on a nonrectangular display area, the method comprising:
   receiving the image to display on the nonrectangular display area having display functionality, the nonrectangular display area defining a shape without display functionality, wherein a region of the image corresponds to the shape without display functionality;
   determining a position of the image within the nonrectangular display area, wherein the position encompasses the shape without display functionality;
   when a critical object at least partially overlaps the shape without display functionality, modifying the image by moving a critical object to a different portion of the image, wherein the different portion of the image does not overlap the shape without display functionality, and wherein a noncritical object comprises an ornamental feature of the image; and
   displaying the modified image within the nonrectangular display area.

2. A method comprising:
   receiving an image to display on a nonrectangular display area having display functionality, the nonrectangular display area defining a shape without display functionality, wherein a region of the image corresponds to the shape without display functionality;
   determining a position of the image within the nonrectangular display area, wherein the position encompasses the shape without display functionality;
   when a critical object at least partially overlaps the shape without display functionality, modifying the image by moving the critical object to a different portion of the image, wherein the different portion of the image does not overlap the shape without display functionality; and
   displaying the modified image within the nonrectangular display area.

3. The method of claim 2, said determining comprising:
   categorizing the region of the image corresponding to the shape without display functionality as a noncritical region when the region comprises a background of the image, or the ornamental feature of the image.

4. The method of claim 2, said determining comprising:
   categorizing the region of the image corresponding to the shape without display functionality as a critical region when the region comprises a functional feature of the image.

5. The method of claim 2, the shape without display functionality comprising a rectilinear shape, a curvilinear shape, or a combination of the rectilinear and the curvilinear shape.

6. The method of claim 2, the image comprising a status bar or a navigation bar.

7. The method of claim 2, said displaying the image of the nonrectangular display area comprising:
   determining a bounding shape containing the shape without display functionality;
   defining a rectangular display area by subtracting the bounding shape from the nonrectangular display area; and
   displaying the image within the rectangular display area.

8. The method of claim 2, said displaying the image of the nonrectangular display area comprising:
   receiving a second image to display on the nonrectangular display area; and
   at least partially overlaying the second image on the image by adjusting a transparency of the second image and displaying both the image and the second image partially occluded by the shape without display functionality.

9. The method of claim 2, said modifying comprising:
   receiving a request from an application to display the image on a full nonrectangular display area;
   checking a permission list indicating whether the application has permission to utilize the full nonrectangular display area; and
   upon confirming that the application is included in the permission list, displaying the image on the full nonrectangular display area, said displaying comprising occluding a part of the image by the shape without display functionality.

10. The method of claim 2, said modifying comprising:
    receiving a request from an application to display the image on a full nonrectangular display area;
    determining an orientation of the nonrectangular display area, the orientation comprising a portrait and a landscape;
    checking a permission list associated with the orientation of the nonrectangular display area, the permission list indicating whether the application has permission to utilize the full nonrectangular display area when the nonrectangular display area is associated with the determined orientation; and upon confirming that the application is included in the permission list associated with the orientation of the nonrectangular display area, displaying the image on the full nonrectangular display area, said displaying comprising occluding a part of the image by the shape without display functionality.

11. The method of claim 2, comprising:
providing to an application associated with a user a widget to adjust the position of the image within the nonrectangular display area;
receiving from the application a preferred position associated with the application; and
displaying the image in the preferred position.

12. The method of claim 11, comprising:
tracking the preferred position associated with the application;
based on a plurality of preferred positions associated with a plurality of users, determining a best preferred position, wherein the best preferred position is specified by the highest number of users in the plurality of users; and
specifying a default display associated with the application to be the best preferred position.

13. The method of claim 2, comprising:
determining that the region of the image corresponding to the shape without display functionality comprises a portion of a noncritical region, wherein the noncritical region is displayed at least partially occluded; and
displaying the image on the nonrectangular display area without adjusting a position of the noncritical region within the image.

14. A system comprising:
a nonrectangular display area having display functionality, the nonrectangular display area defining a shape without display functionality;
a processor associated with the nonrectangular display area;
a storage medium storing computer-executable instructions that, when executed by the processor, cause the system to perform a computer-implemented operation, the instructions comprising:
  instructions for receiving an image to display on the nonrectangular display area having a display functionality, the nonrectangular display area defining the shape without display functionality, wherein a region of the image corresponds to the shape without display functionality;
  instructions for determining a position of the image within the nonrectangular display area, wherein the position encompasses the shape without display functionality;
  instructions for when a critical object at least partially overlaps the shape without display functionality, modifying the image by moving the critical object to a different portion of the image, wherein the different portion of the image does not overlap the shape without display functionality; and
  instructions for displaying the modified image within the nonrectangular display area.

15. The system of claim 14, the instructions comprising:
instructions for categorizing the region of the image corresponding to the shape without display functionality as a noncritical region when the region comprises a background of the image, or an ornamental feature of the image.

16. The system of claim 14, the shape without display functionality comprising a rectilinear shape, a curvilinear shape, or a combination of the rectilinear and the curvilinear shape.

17. The system of claim 14, the image comprising a status bar or a navigation bar.

18. The system of claim 14, the instructions comprising:
instructions for receiving a second image to display on the nonrectangular display area; and
instructions for overlaying the second image on the image by adjusting a transparency of the second image and displaying both the image and the second image on the nonrectangular display area partially occluded by the shape without display functionality.

19. The system of claim 14, the instructions comprising:
instructions for receiving a request from an application to display the image on a full nonrectangular display area;
instructions for checking a permission list indicating whether the application has permission to utilize the full nonrectangular display area; and
upon confirming that the application is included in the permission list, instructions for displaying the image on the full nonrectangular display area, said displaying comprising occluding a part of the image by the shape without display functionality.

20. The system of claim 14, the instructions comprising:
instructions for providing to an application associated with a user a widget to adjust the position of the image within the nonrectangular display area;
instructions for receiving from the application a preferred position associated with the application; and
instructions for displaying the image in the preferred position.

21. The system of claim 20, the instructions comprising:
instructions for tracking the preferred position associated with the application;
based on a plurality of preferred positions associated with a plurality of users, instructions for determining a best preferred position, wherein the best preferred position is specified by the highest number of users in the plurality of users; and
instructions for specifying a default display associated with the application to be the best preferred position.

* * * * *